United States Patent [19]

Sato

[11] 4,388,492

[45] Jun. 14, 1983

[54] MINIATURE STEREO DEVICE WITH EXTENSIBLE SPEAKERS

[75] Inventor: Masaaki Sato, Hachioji, Japan

[73] Assignee: Olympus Optical Company Limited, Tokyo, Japan

[21] Appl. No.: 210,598

[22] Filed: Nov. 26, 1980

[30] Foreign Application Priority Data

Mar. 7, 1980 [JP] Japan .................................. 55-28778

[51] Int. Cl.³ ............................................. H04R 5/02
[52] U.S. Cl. .................................. 179/1 GA; D14/5; D14/6; D14/68; 455/350
[58] Field of Search ............. D14/5, 6, 68, 70, 72-75; 179/1 GA, 146 E, 179; 455/348, 350; 361/391, 422

[56] References Cited

U.S. PATENT DOCUMENTS

| D. 179,445 | 12/1956 | Eaton | D14/74 X |
| D. 227,908 | 7/1973 | Romano | D14/6 |
| D. 240,657 | 7/1976 | Sugawara | D14/5 |
| D. 249,260 | 9/1978 | Hirota | D14/6 |
| 4,070,546 | 1/1978 | Hirota | 179/1 GA |

*Primary Examiner*—A. D. Pellinen
*Attorney, Agent, or Firm*—Toren, McGeady & Stanger

[57] ABSTRACT

A miniature stereo device which provides a satisfactory stereo effect includes a main body having an audio device which generates a stereo output, and a pair of speakers positioned at both sides of the main body for reproducing the stereo output. One of the speakers is arranged to be extended to a position at which it is separated and fixed relative to the other speaker at a desired distance, in order to obtain an optimum stereo effect.

8 Claims, 10 Drawing Figures

MINIATURE STEREO DEVICE WITH EXTENSIBLE SPEAKERS

BACKGROUND OF THE INVENTION

1. Field of the Invention

This invention relates to a miniature stereo device whose size fits a pocket or bag.

2. Description of Prior Art

The recent trend toward miniaturization of audio devices is remarkable. Hence, a variety of super miniature radios and tape recorders to fit a pocket or bag have been devised. It is, however, difficult to expect a satisfactory effect with such super miniature audio devices even by arranging a pair of speakers to tentatively provide stereo functions. This is due to the difficulty in securing a sufficient distance between the speakers.

For this reason, it is generally impossible for several people to simultaneously enjoy stereo devices. Hence, they are only stereo devices to be used individually with an earphone.

SUMMARY OF THE INVENTION

An object of the present invention is to eliminate the above described drawbacks of miniature stereo devices.

Another object of this invention is to provide a miniature stereo device so that a sufficient stereo effect can be had by making at least either one of a pair of speakers positioned on the body of the audio device move toward the direction openly separated from the other speaker and by securing a sufficient distance between both speakers.

The present invention comprises a main body of an audio device which generates a stereo output, a pair of speakers positioned at both sides of the main body to which said stereo output is provided, and means for allowing at least one of the speakers to move adjustably in the direction along which the speaker can be separated and fixed relative to the other speaker; said means, mounted on the main body of said audio device so that it can slide, comprises the housing in which said speakers are placed, the main body of said audio device comprises a tape recorder, said housing has the lid portion on the cassette room of said tape recorder, said means comprises the expandable arm arranged on the main body of said audio device, said arm, which comprises a pair of conductors concurrently holding the lead wire making the electrical connection between the main body of said audio device and the speakers, said arms holds, concurrently, the antenna in the main body of said audio device.

DESCRIPTION OF THE PREFERRED EMBODIMENT

Figure 1:
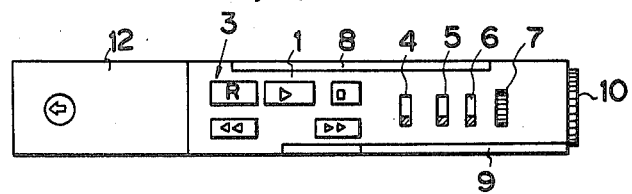
FIGS. 1(a) and (b) illustrate the condition, as one example of this invention, wherein a housing is fitted to the main body of an audio device; (a) is a plane view and (b) is a front view.
Figure 1:
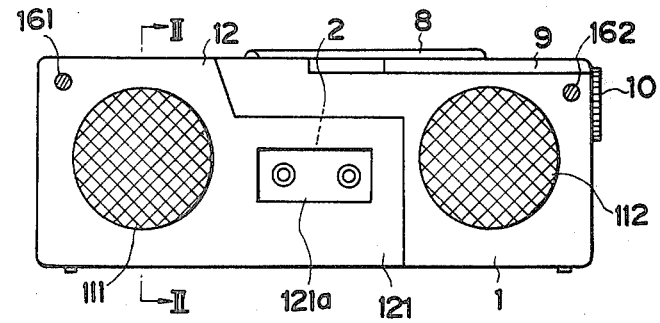

FIG. 1 is an illustration of an example of the present invention applied to a stereo tape recorder incorporating a radio. The drawing shows the main body 1 of the tape recorder, wherein the "micro cassette" tape recorder, which is a brand name, incorporating a radio developed by the present assignee, is adopted.

Figure 2:
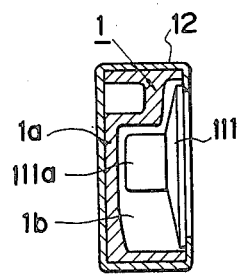
FIG. 2 is a section taken along lines 2—2 of FIG. 1(b).

Arranged in main body 1 of the tape recorder are cassette chamber 2, tape recorder operation switch 3, radio and tape recorder change over switch 4, radio FM and AM change over switch 5, radio and microphone change over switch 6, volume knob 7, antenna 8, tuning meter 9 and tuning dial 10. Also, a pair of speakers 111 and 112 are provided at both sides; that is, on the right and left of main body 1 of the tape recorder. Of the speakers 111 and 112, speaker 111, on the left hand side, is placed in independent housing 12. Housing 12, mounted on main body 1 of said tape recorder, is arranged so that it moves for a prescribed distance in the direction such that it can be openly separated from speaker 112 on the right hand side. In this case, as illustrated in FIG. 2, an arrangement is used whereby housing 12 is fitted to frame portion 1a of main body 1 of the tape recorder. From 1b of FIG. 2 it can be seen that the groove portion is provided to allow passage of magnet portion 111a of speaker 111 placed inside housing 12.

Cassette lid portion 121 is formed in housing 12 as a body over the upper surface of said cassette chamber 2. Cassette window 121a is formed in this cassette lid portion 121. In case, when housing 12 is fitted to main body 1 of the tape recorder, cassette lid portion 121 covers the upper surface of cassette chamber 2 which in turn will be exposed to the front face of main body 1 of the tape recorder by the sliding operation of housing 12. Also this cassette lid portion 121 covers, by the sliding operation of housing 12, the upper surface of groove portion 1b formed at frame portion 1a of main body 1.

On the other hand, arranged in main body 1 of said tape recorder are eject button 13 and the control section, which is not normally used. For instance, it has balance adjustment knob 14 for speakers 111 and 112 on the right and left hand side and volume adjustment knob 15, all of which appear on frame portion 1a by said sliding operation. This is shown in FIGS. 3(a) and (b).

Microphones 161 and 162 are provided on the right and left hand sides. Therefore, when housing 12 is arranged to fit main body 1 of the tape recorder as shown in FIGS. 1(a) and (b), the tape recorder may be used as a super miniature stereo tape recorder which can be conveniently carried in the pocket or a bag. Under this condition, it is possible to enjoy stereo broadcasting with an earphone.

Figure 3:
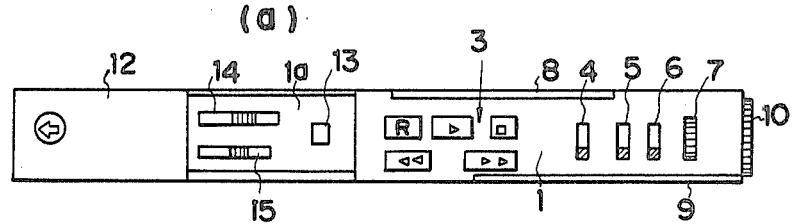
FIGS. 3(a) and (b) illustrate the condition, as an example of this invention, wherein the housing can slide; (a) is a plane view and (b) is a front view.
Figure 3:
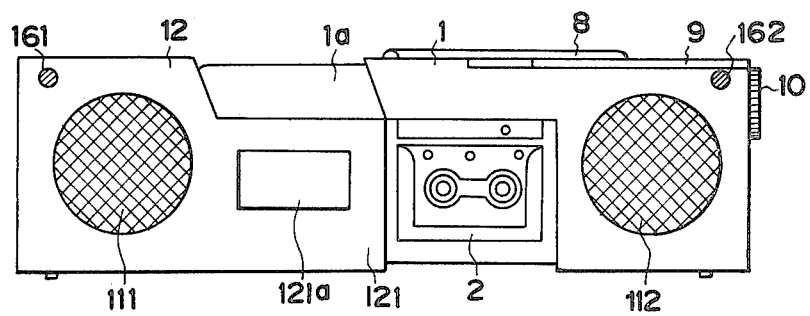

Also, as indicated in FIGS. 3(a) and (b), a sufficient distance between speaker 111 and 112 can be attained by operating housing 12 to slide toward the position whereat the housing is openly separated from speaker 112 on the right hand side. By this, when the stereo output is generated from main body 1 of the tape recorder, a satisfactory stereo effect can be had from both speakers 111 and 112. In this case, by the sliding operation of housing 12, cassette chamber 2 appears open to the front of main body 1 of the tape recorder, thus allowing simple replacement of the cassette.

It goes without saying that the radio broadcasting may be heard from both speakers 111 and 112 with a stereo effect by selecting the radio with change over switch 4.

With such a mechanism, therefore, a sufficient distance between the pair of speakers can be had by sliding the housing, in which one speaker is placed, toward the direction in which the housing is openly separated from the other speaker. Hence, an extremely satisfactory stereo effect can be expected with the present super miniature tape recorder, although it has generally been considered impossible. Also, the groove formed at the frame side of the main body of the tape recorder to pass the magnet of the speaker placed in the housing is so arranged that it is covered with the lid portion 121 of the cassette chamber even when the housing is operated to slide. Hence, it is possible to constantly obtain a satisfactory external appearance. Furthermore, the eject button on the cassette chamber can be used only when the cassette chamber appears open at the front face of the main body of the tape recorder by the sliding operation of the housing. Hence, irregularities such as falling of the cassette, due to an inadvertent eject operation under the condition shown in FIGS. 1(a) and (b), that is, when being carried, can surely be prevented. Because the control section, which is not normally used, is provided on the frame portion that appears by the sliding operation of the housing, the arrangement of each operating section may be simplified. Hence, it is possible to prevent erroneous operations and at the same time to simplify handling of the tape recorder.

Referring now to FIGS. 4(a) and (b), a description of the other example of the present invention is made as follows: FIGS. 4(a) and (b) illustrate the invention applied to a super miniature stereo radio.

As shown in the figure, a main body 21 of the radio has its control portion on the front face such as tuning dial 22 and dial scale 23. Also, speakers 241 and 242 are provided at both sides, that is, on the right and left hand side of main body 21. In this case, one of these pair of speakers 241 and 242, for instance, right hand speaker 242 is placed in an independent housing 252.

The housing 252 is provided on main body 21 of said radio through the intermediary of expandable arms 261 and 262. With a telescoping configuration similar to that of an expandable antenna, which is made by coaxially arranging a plural number of tightly fitted tubular members, arms 261 and 262 may be fixed at one end in main body 21 of the radio and have the capability to obtain a prescribed distance between speakers 241 and 242, and a stereo effect can be expected by widening the distance. These arms 261 and 262 may comprise a conductive material to form the lead wires to make an electrical connection between main body 21 of the radio and speaker 242, or they may comprise an insulating material in which expandable conductors may be placed along the hollow portion of arms 261 and 262.

Figure 5:
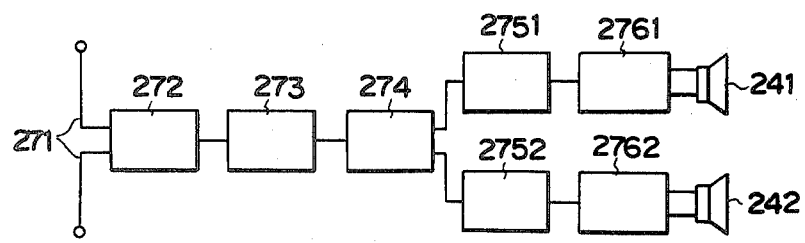
FIG. 5 is a block diagram showing a FM receiving circuit used in the same example.

On the other hand, incorporated in main body 21 of the radio is, for instance, a 2 band AM and FM receiver. In this case, the FM receiving circuit generates the stereo output by receiving stereo broadcasts. As in the example shown in FIG. 5, it comprises FM antenna 271, high frequency amplification and hybrid circuit 272, intermediary frequency amplification circuit 273, multiplex circuit 274, right and left hand side preamplification circuits 2751 and 2752 and output amplification circuits 2761 and 2762. The right and left hand side speakers 241 and 242 are, respectively, connected to the output terminals of output amplification circuits 2761 and 2762. In this case, said arms 261 and 262 may be used in place of said FM antenna 271. The circuits shown in FIG. 5 are well known; a description here will be omitted.

Figure 4:
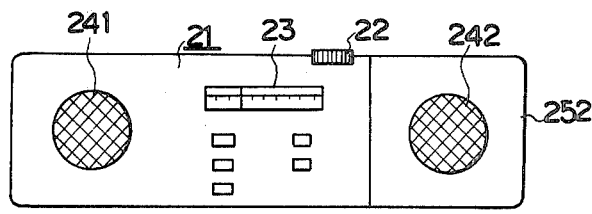
FIGS. 4(a) and (b) illustrate the condition, as another example of this invention, wherein (a) shows the condition when a sliding arm is contracted, and (b) is a front view when the arm is expanded.
Figure 4:
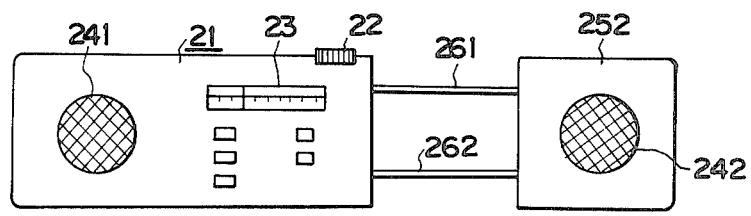

By arranging this, and when arms 261 and 262 are placed inside main body 21 of the radio, while housing 252 of speaker 242 is fitted to the side face of main body 21 of the radio, as shown in FIG. 4, it is possible to use the super miniature radio and also carry it in the pocket or a bag.

Also, when arms 261 and 262 are extended and hence housing 252 of speaker 242 is openly separated from main body 21 of the radio, it is possible to secure a sufficient distance between speakers 241 and 242. As a result, when the stereo output is generated from the FM receiving circuit, it is possible to listen to FM stereo broadcasts from speakers 241 and 242 with a satisfactory stereo effect.

Therefore, such a construction also helps to secure a sufficient distance between a pair of speakers by expanding the arms. Thus, a satisfactory stereo effect can be expected with the improved super miniature radio, which is generally considered impossible to use as a stereo device.

Figure 6:
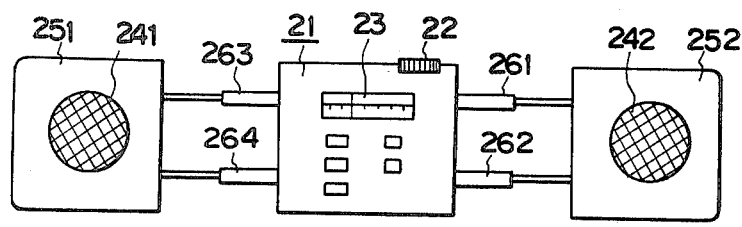
FIG. 6 is a front view showing a different example of the present invention.

Referring now to FIG. 6, a different example of this invention is described as follows: The illustrations in FIG. 6 carry the same symbols as in FIG. 4. In this case, the constitution is such that the left hand side speaker 241, which is one of the speakers 241 and 242, is placed in an independent housing 251 similar to the right hand side speaker 242 provided on main body 21 of the radio, through the intermediary of expandable arms 263 and 264. The arrangement of other sections is the same as shown in FIG. 4.

By arranging this, the distance between speakers 241 and 242 is made wider to further strengthen the stereo effect. Also, the right and left hand side speaker housings 251 and 252 are in a shape equivalent to each other. Hence, they provide the characteristics of giving out a uniform sound from speakers 241 and 242. By this too, a satisfactory stereo effect may be obtained.

Figure 7:
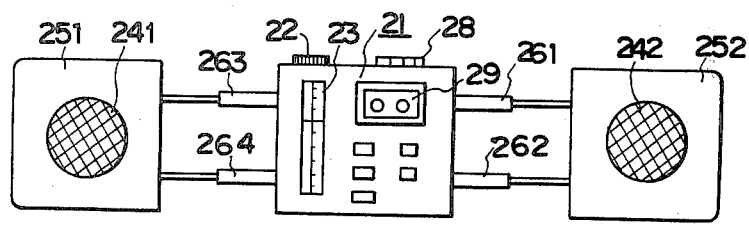
FIG. 7 is a front view showing yet another example of the present invention.

Referring to FIG. 7 another example of the invention is described as follows: Here, FIG. 7 shares with FIG. 6 the same symbols for the same parts. In this case, main body 21 is what is known as the radio cassette incorporating the already known micro cassette tape recorder. In the figures, a cassette loading chamber 28 and an operation button 29 of the tape recorder are shown. The other parts carry the same symbols as shown in FIG. 6.

By the arrangement of FIG. 7, the same effect as mentioned above may be expected.

It is necessary to note that the invention is not limited only to the above examples. It can be executed by modifying from time to time, but within the range and by not altering the main facets of the invention. For instance, in the example described in FIG. 1, the left hand side speaker is placed in an independent housing which can slide freely. But the speakers on the right and left hand side may be placed in independent housings respectively to make them slide. The aforementioned examples are related to the radio, radio cassette or radio tape recorder, but may be applied to other audio devices.

What is claimed is:

1. A minature stereo device comprising an audio device which generates a stereo output, said audio device including a main body, a pair of speakers positioned at both sides of said main body and facing in a forward direction relative to said main body for reproducing said stereo output and directing the reproduced stereo output in the forward direction, and extensible means fixed to said main body and to at least one of said pair of speakers for enabling said at least one speaker to be adjustably linearly moved in the direction perpendicular to the forward direction between a minimum separation and a maximum separation and to be held at a desired position whereat the speaker is linked to but separated from the other speaker for obtaining an optimum stereo effect.

2. A minature stereo device according to claim 1, wherein said extensible means comprises a speaker housing in which said at least one speaker is placed.

3. A minature stereo device according to claim 2, wherein said main body of said audio device comprises a control section including manually actuable members for controlling certain operations of said audio device, said actuable members being covered by said speaker housing when said at least one speaker is at said minimum separation.

4. A minature stereo device according to claims 2 or 3, wherein said main body of said audio device comprises a stereo tape recorder.

5. A minature stereo device according to claim 4, wherein said speaker housing includes a lid for covering a cassette chamber of said tape recorder when said at least one speaker is at said minimum separation.

6. A minature stereo device according to claim 1, wherein said extensible means comprises a telescoping arm fixed at one end on the main body of said audio device.

7. A minature stereo device according to claim 6, wherein said extensible means comprises two telescoping arms forming a pair of conductors for making electrical connection between the main body of said audio device and said at least one speaker.

8. A minature stereo device according to claim 7, wherein said two telescoping arms form an antenna for a receiving circuit contained in the main body of said audio device.

* * * * *